United States Patent [19]

Taylor et al.

[11] Patent Number: 5,371,148
[45] Date of Patent: Dec. 6, 1994

[54] REACTIVE POLYMERS HAVING PENDANT FLEXIBLE SIDE CHAINS PREPARED FROM ETHYLENICALLY UNSATURATED CARBODIIMIDES

[75] Inventors: James W. Taylor, Kingsport; Martha J. Collins, Blountville, both of Tenn.; David R. Bassett, Cary, N.C.

[73] Assignee: Union Carbide Chemicals & Plastics Technology Corporation, Danbury, Conn.

[21] Appl. No.: 81,976

[22] Filed: Jun. 23, 1993

[51] Int. Cl.$^5$ .............................................. C08F 265/04
[52] U.S. Cl. .................................. 525/293; 525/301; 525/308
[58] Field of Search .................... 525/293, 301, 308

[56] References Cited

U.S. PATENT DOCUMENTS

| | | |
|---|---|---|
| 3,547,849 | 12/1970 | Kennedy. |
| 3,629,169 | 12/1971 | Bedighian. |
| 3,950,287 | 4/1976 | Coats et al.. |
| 3,988,272 | 10/1976 | Watts et al.. |
| 4,033,920 | 7/1977 | Isozaki et al.. |
| 4,057,538 | 11/1977 | Habu et al.. |
| 4,077,931 | 3/1978 | Leitheiser et al.. |
| 4,244,850 | 1/1981 | Mylonakis. |
| 4,248,978 | 2/1981 | de Cleur et al. ............ 525/124 |
| 4,680,361 | 7/1987 | Koleske et al. ............ 525/329.5 |
| 4,820,863 | 4/1989 | Taylor ............................ 560/115 |
| 4,954,559 | 9/1990 | Den Hartog et al. ......... 525/128 |
| 5,105,010 | 4/1992 | Sundararaman et al. ...... 564/252 |

*Primary Examiner*—Vasu S. Jagannathan
*Attorney, Agent, or Firm*—G. L. Coon

[57] ABSTRACT

This invention relates to reactive polymers, e.g., aqueous emulsion polymers, having pendant flexible or dangling side chains prepared from ethylenically unsaturated carbodiimides, e.g., carbodiimide (meth)acrylates. The reactive polymers contain ethylenic unsaturation near the surface or in the surface area of the particles that form the polymers, the ethylenic unsaturation being connected to the polymer through the pendant flexible or dangling side chains. This invention also relates to the process for preparing the reactive polymers, to crosslinkable formulations based on the reactive polymers, and to thermoplastic and crosslinked films prepared from the reactive polymers. The reactive polymers are useful as decorative and functional coatings, inks, adhesives, textile coatings and sealants.

7 Claims, No Drawings

REACTIVE POLYMERS HAVING PENDANT FLEXIBLE SIDE CHAINS PREPARED FROM ETHYLENICALLY UNSATURATED CARBODIIMIDES

BRIEF SUMMARY OF THE INVENTION

1. Technical Field

This invention relates to reactive polymers, e.g., aqueous emulsion polymers, having pendant flexible or dangling side chains prepared from ethylenically unsaturated carbodiimides, e.g., carbodiimide (meth)acrylates. The reactive polymers contain ethylenic unsaturation near the surface or in the surface area of the particles that form the polymers, the ethylenic unsaturation being connected to the polymer through the pendant flexible or dangling side chains. This invention also relates to the process for preparing the reactive polymers, to crosslinkable formulations based on the reactive polymers, and to thermoplastic and crosslinked films prepared from the reactive polymers. The reactive polymers are useful as decorative and functional coatings, inks, adhesives, textile coatings and sealants.

2. Background of the Invention

Aqueous emulsion polymers or latexes in both clear and pigmented form are well-known, widely-used articles of commerce. Examples of these uses include interior and exterior architectural coatings, general metal coatings, adhesives, and the like. The latexes are formed by aqueous emulsion polymerization of monoethylenically unsaturated monomers as styrene, butyl acrylate, methyl methacrylate, vinyl acetate, acrylic acid, glycidyl acrylate, 2-hydroxyethyl acrylate, and similar compounds. When ethylenically unsaturated monomers that contain a functionality other than unsaturation, such as the carboxyl group in acrylic acid, and the hydroxyl group in 2-hydroxyethyl acrylate, are used, there is a propensity for these groups to be found at or near the surface of the emulsion particles because of the affinity of the groups for the aqueous environment. In addition, techniques for increasing the amount of any non-water reactive functional group near the surface of the emulsion particles are known to those skilled in the art of emulsion polymerization. Illustrative of such techniques is the production of a core and shell latex in which a the core of the particles has a given composition that may contain a small amount of the functional groups or be devoid of them and the shell or outer layers of the particle have a different composition which may be rich in the functional groups, and the like.

There is a need for products that have improved, lower initial molecular weight characteristics, improved adhesion, and products that will crosslink under ambient conditions or low to moderate temperatures in the presence of air.

DISCLOSURE OF THE INVENTION

This invention relates in part to a polymer having one or more pendant flexible side chains connected thereto, wherein said pendant flexible side chains contain ethylenic unsaturation and are connected to said polymer by an N-acyl urea linkage, said N-acyl urea linkage formed by the reaction of an ethylenically unsaturated carbodiimide with a carboxylic acid group on said polymer.

This invention also relates in part to a process for preparing a polymer having one or more pendant flexible side chains connected thereto comprising:

(a) preparing a precursor polymer having carboxyl group functionality from one or more ethylenically unsaturated monomers;

(b) post reacting the precursor polymer with one or more ethylenically unsaturated carbodiimides; and (c) optionally recovering the step (b) polymer and redissolving it in an organic solvent.

It has been found that ethylenic unsaturation of various types can be formed on, in, or near the surface of polymer particles that contain free, reactive carboxylic acid functionality by first preparing a precursor polymer and then post reacting it with one or more ethylenically unsaturated carbodiimides, e.g., carbodiimide (meth)acrylates, containing a functional group that will react with all or a portion of the free, reactive carboxyl functionality on the precursor polymer particle. The post reactant will contain an ethylenic unsaturation group that can air dry or force dry into a crosslinked, solvent resistant coating with broad utility characteristics. Air dry means to cure the liquid coating into a solid film by allowing it to remain under ambient conditions for a period of time sufficient to effect solidification. Force dry means to cure the liquid coating into a solid film by exposing it to a thermal source such as an oven, to an actinic radiation source such as ultraviolet light, as electron beams, as lasers, and the like with or without a predrying step under ambient conditions to remove water, solvent, or other carrier. For purposes of this invention, ethylenic unsaturation shall include all permissible compounds, groups or substituents having at least one carbon-carbon double bond including, for example, (meth)acrylates, vinyls, allyls, alkenes and the like.

In an embodiment of this invention, the post modified polymer containing ethylenic unsaturation is recovered from the aqueous environment, dissolved in an organic solvent, and applied to a substrate to effect air-cure crosslinking. In specific embodiments of this invention, the water-borne polymer particles can be crosslinked with free radicals generated from an actinic energy source such as an electron beam or by formulation with a free radical-generating photoinitiator and, if necessary, a synergist, and exposed to an ultraviolet light source such as sunlight, mercury vapor lamps, xenon lamps, etc.

In another embodiment of the invention, the polymer precursor containing free, reactive carboxyl functionality can be recovered from the aqueous media and dissolved in an organic solvent or can be prepared in an organic solvent. The polymer in organic solvent can be modified by post reaction with one or more of the above described reactants for aqueous systems to form a polymer with pendant flexible chains having ethylenic unsaturation connected thereto that can be crosslinked under ambient, air-cure conditions or radiation-cure conditions.

In a further embodiment of the invention, the post modified polymers containing ethylenic unsaturation neat or formulated with photoinitiator and/or other radiation-reactive chemicals is recovered as a solid, uncrosslinked film by removal of either the aqueous or organic solvent media. The solid film is then used as a photoresist in the manufacture of printed circuit boards or other article by selective exposure to radiation. Selective exposure is provided by a mask through which radiation does not penetrate.

The reactive polymers of the invention can be used in a variety of ways including but not limited to clear, colored, filled, or pigmented crosslinked latexes, waterborne alkyds, solvent-borne alkyds, radiation curable systems, and the like. Illustrative of generalized utility areas are coatings for metal, paper, plastics, wood, and masonry; inks; adhesives; binding agents for concrete; photoresists; and the like. Among the specific coating end uses that can be mentioned are interior and exterior architectural coatings, can coatings, office and home furniture coatings, pipeline coatings, sign coatings, maintenance coatings, business machine coatings, functional and decorative automotive coatings, textile coatings, conformal coatings, electrical and electronic coatings and the like.

DETAILED DESCRIPTION

Carboxyl group functionalized polymer particles can be reacted with one or more ethylenically unsaturated carbodiimides, e.g., carbodiimide (meth)acrylates, in which the reaction takes place with a carboxylic acid group to form a free ethylenically unsaturated terminated, pendant flexible side chain connected to the polymer particle through an N-acyl urea linkage. For purposes of this invention, the term "N-acyl urea linkage" is contemplated to include all permissible linkages resulting from the reaction of an ethylenically unsaturated carbodiimide with a carboxylic acid group on the polymer which links an ethylenically unsaturated terminated. pendant flexible side chain to the polymer.

The polymers having carboxyl group functionality can be prepared from a variety of monoethylenically unsaturated monomers including, for example, acrylates and methacrylates (both referred to herein as (meth)acrylates); vinyl esters; vinyl aromatic, cycloaliphatic, and heterocycles; hydroxyalkyl (meth)acrylates and their derivatives; vinyl halogens and vinylidine halogens; alkenes and substituted alkenes; nitriles; and vinyl ethers. If desired, minor amounts of di- or triethylenically unsaturated monomers can be used if they do not unduly interfere with the polymerization process by causing excessive crosslinking and unusable polymer formation. Various carboxylic acid monomers can be used, such as acrylic acid, methacrylic acid, ethacrylic acid, alpha-chloroacrylic acid, crotonic acid, fumaric acid, citraconic acid, mesaconic acid, itaconic acid, maleic acid and the like including mixtures thereof. Illustrative of the (meth)acrylates are methyl (meth)acrylate, ethyl (meth)acrylate, propyl (meth)acrylates, butyl (meth)acrylates, pentyl (meth)acrylates, hexyl (meth)acrylates, heptyl (meth)acrylates, octyl (meth)acrylates, nonyl (meth)acrylates, decyl (meth)acrylates, and the like. Illustrative of the vinyl esters are vinyl acetate, vinyl propionates, vinyl butyrates, vinyl pivalates, vinyl hexanoates, vinyl hepanoates, vinyl octanoates, vinyl isovalerate, vinyl 2-ethylhexanoate, vinyl benzoates, vinyl crotonate, vinyl laurates, vinyl myristate, vinyl linoleate, vinyl linolenate, vinyl cinnamate, vinyl stearates, vinyl oleate, vinyl napthanoates, vinyl cyclopentanoates, vinyl versatates, vinyl salicylate, monovinyl adducts of difunctional or higher functional carboxylic acids such as monovinyl adipate, and the like. Illustrative of the vinyl aromatic, cycloaliphatic, and heterocycles are styrene, vinyl cyclohexane, vinyl cyclopentane, vinyl toluene, vinyl anthracenes, 3-vinyl benzyl chloride, 4-vinyl biphenyl, 4-vinyl-1-cyclohexene, vinyl cyclooctane, 2-vinyl naphthalene, 5-vinyl-2-norbornene, 1-vinyl imidazole, 2-vinyl pyridine, 4-vinyl pyridine, 1-vinyl-2-pyrrolidinone, 9-vinyl carbazole, 3-vinylbenzyl chloride, and the like. The hydroxyalkyl (meth)acrylates and their derivatives include 2-hydroxyethyl acrylate (HEA), hydroxypropyl acrylate (HPA), ethylene oxide and propylene derivatives of HEA and HPA containing from 1 to about 20 moles of the alkylene oxide, caprolactone (meth)acrylates which are epsilon-caprolactone derivatives of HEA and HPA containing from 1 to about 6 moles of epsilon-caprolactone, carboxylic acid terminated adducts of HEA and HPA and the alkylene oxide and caprolactone derivatives of HEA and HPA, and the like. Illustrative of the vinyl halogens and vinylidine halogens are vinyl chloride, vinylidine chloride, vinyl fluoride, vinylidine fluoride, and the like. Illustrative of the alkenes and substituted alkenes are ethylene, propylene, butenes, pentenes, hexenes, heptenes, octenes, nonenes, decenes, 4-chloro-1-butene, 4, 6-dichloro-1-hexene, 5-fluoro-2-hexene, and the like. Illustrative of the nitriles are acrylonitrile, methacrylonitrile, and the like. Illustrative of the vinyl ethers are methyl vinyl ether, ethyl vinyl ether, propyl vinyl ethers, butyl vinyl ethers, pentyl vinyl ethers, hexyl vinyl ethers, hepty vinyl ethers, octyl vinyl ethers, 2-methyl-butyl vinyl ether, and the like.

The polymers are prepared by conventional techniques as exemplified herein and as are known to those skilled in the art of polymerization. The molecular weight of the copolymers making up the polymer particles can vary over wide ranges of average molecular weight and can have number-average molecular weights of from about 1000 to about 1,000,000 or more with a distribution of molecular weights existing. Since film formation of aqueous emulsion polymers conventionally takes place by particle coalescence in which the outer regions of the particles come together and interact to form the final film, it is preferable that the polymer particles of this invention contain a major quantity of the functional groups in, at or near the surface (i.e., the surface region) of the particles, though it is realized that some of the functional groups may be positioned within the interior of the particles. Although the number of copolymers in each polymer particle is indeterminate since particle size and copolymer molecular weight will vary, it is important that, on the average, carboxyl functionality exist on a majority of any copolymer molecules and that at least some of the functionality be found in the surface region or related region so it can react with the post reaction reactants. Other functional groups such as hydroxyl, amine, etc., may also be present in the carboxyl functional polymers, i.e., precursor polymers, used in this invention.

Illustrative of the ethylenically unsaturated carbodiimides, e.g., carbodiimide (meth)acrylates, that can be used for post reaction with the precursor polymer particles to produce the reactive polymers of the invention are the hydrocarbyl carbodiimide (meth)acrylates such as methyl carbodiimide (meth)acrylate, ethyl carbodiimide (meth)acrylate, propyl carbodiimide (meth)acrylates, butyl carbodiimide (meth)acrylates, pentyl carbodiimide (meth)acrylates, hexyl carbodiimide (meth)acrylates, octyl carbodiimide (meth)acrylates, decyl carbodiimide (meth)acrylates, phenyl carbodiimide (meth)acrylate, cyclohexyl carbodiimide (meth)acrylate, methyl phenyl carbodiimide (meth)acrylates, dimethyl phenyl carbodiimide (meth)acrylates; isopropyl, t-butyl, phenyl, and cyclohexyl carbodiimide ethyl (meth)acrylate, carbodiimide di(meth)acrylate, carbodiimide di(ethyl acrylate) carbodiimide di(methyl (meth)acrylate), carbodiimide di(propyl (meth)acrylate)s, carbodiimide di(butyl (meth)acrylate)s, carbodiimide di(hexyl (meth)acrylate)s, carbodiimide di(octyl (meth-)acrylate)s, carbodiimide di(cyclohexyl (meth)acrylate)s, and the like. Mixtures of various ethylenically unsaturated carbodiimides may be used for purposes of this invention. Both substituted and unsubstituted ethylenically unsaturated carbodiimides may be used for purposes of this invention.

In an embodiment of this invention, initial aqueous emulsions used to prepare aqueous emulsion polymers of this invention have an initial pH of about 2.0 to 10.5 and contain about 0.05 to 20% or more of carboxylic acid functionality, preferably an initial pH of 3.5 to 9.0 and contain from about 0.1% to 15% carboxylic acid functionality, and are prepared at about 40° C. to about 100° C. for about 6 to 48 hours, preferably at about 60° C. to about 90° C. for about 10 to about 24 hours under atmospheric pressure or superatmospheric pressure of about 15 psig to about 100 psig.

The post reaction leading to the reactive polymers of this invention are carried out at a temperature of from about 0° C. to about 100° C., preferably from about 20° C. to about 90° C., for about 30 minutes to 24 hours or more under atmospheric or superatmospheric pressure of about 15 psig to about 100 psig.

Although not essential, a stoichiometric deficiency of the ethylenically unsaturated carbodiimide may be employed in order to leave some carboxyl functionality in the polymer. Excess carbodiimide is generally avoided since it introduces residual unpolymerized monomer which is undesirable. At least about 0.5% of the ethylenically unsaturated carbodiimide, based on the weight of the polymer, is used. Based on the acid content of the precursor polymer, it is preferred to consume at least 5%, preferably from 10% to about 90%, of the acid (carboxyl) by reaction with the ethylenically unsaturated carbodiimide.

As indicated above, other functional groups such as hydroxyl, amine, etc., may be present in the carboxyl functional polymers, i.e., precursor polymers, used in this invention. Other permissable post reactions may be carried out in a sequential manner so there is no adverse interaction of the reactants used for the post reaction of this invention. Illustrative of other such post reactions include, for example, (1) reaction with an ethylenically unsaturated isocyanate wherein reaction takes place with hydroxyl groups on the precursor polymer particle; (2) reaction with an ethylenically unsaturated isocyanate wherein reaction preferentially takes place with hydroxyl groups on the precursor polymer particle to form free vinyl groups connected to the particle with urethane linkages followed by reaction with an imine to form amine groups on the precursor polymer particle and then with an ethylenically unsaturated isocyanate wherein reaction takes place with the amine groups to form free vinyl groups connected to the particle with urea linkages; (3) reaction with an ethylenically unsaturated isocyanate wherein reaction preferentially takes place with hydroxyl groups on the precursor polymer particle to form free vinyl groups connected to the precursor polymer particle with urethane linkages followed by reaction with an imine to form amine groups on the precursor polymer particle and then with either a mixture or a sequence of glycidyl (meth)acrylate and a carbodiimide (meth)acrylate; and the like. Both substituted and unsubstituted post reactants may be used for purposes of this invention. This invention is not intended to be limited in any manner by the number or combination of permissible post reactions.

The reactive polymers, e.g., aqueous emulsion polymers, of this invention can be used in a variety of ways illustrative of which are as air-dry coatings that will increase in molecular weight presumably through crosslinking by reaction with atmospheric oxygen and/or incidental radiation under ambient conditions without the use of heavy metal catalysts known as drier salts, though such catalysts may be optionally included in coating formulations if desired; as thermally crosslinkable coatings when formulated with peroxides that will break down and cause crosslinking to take place through the ethylenic unsaturation; as radiation curable coatings, preferably in the presence of free-radical generating photoinitiators of either the homolytic fragmentation type or the hydrogen abstraction type which are usually used in combination with a nitrogen-containing synergist when ultraviolet light is used as the radiation source; as solvent reduced coatings in which relatively large quantities of solvent, i.e., more than flexibilizing or plasticizing quantities, are added to the formulation before application to a substrate; and the like.

The reactive polymers of this invention may be used alone or in combination with other systems illustrative of which are aqueous emulsions, water reducible alkyds, solutions of polymers, radiation-curable (meth)acrylates or epoxides, unsaturated fatty acid derivatives, linseed oil, soybean oil, tall oil, and the like. In an embodiment of this invention, aqueous alkyds having molecular weights of from about 500 to 5000 are prepared by adding chain transfer agents to the emulsion polymers during polymerization. In another embodiment of this invention, the reactive polymers of this invention are recovered as a solid, redissolved in an organic solvent, and formulated into solvent-borne coatings, particularly high solids alkyd coatings when low molecular weight polymers are formed in the emulsion process. Suitable solvents are polar in nature illustrative of which are esters, ketones, esters of lactic acid; ethylene oxide glycol ethers as ethylene glycol monomethyl ether, ethylene glycol and diethylene glycol monoethyl ethers, ethylene glycol and diethylene glycol monopropyl ethers, ethylene glycol and diethylene glycol monobutyl ethers, and ethylene glycol and diethylene glycol monohexyl ethers; propylene oxide glycol ethers such as propylene glycol and dipropylene glycol monomethyl ethers, propylene glycol and dipropylene glycol monopropyl ethers, propylene glycol and dipropylene glycol monobutyl ethers, propylene glycol monobutyoxyethyl ether; toluene, methyl ethyl ketone, xylene, dimethylformamide, ethyl acetate, butyl acetate, tetrahydrofuran, 1,1,1-trichloroethane, cyclohexanone, hydroxyethers, and the like. If desired, these solvents may be used in combination with aliphatic hydrocarbons, aromatic hydrocarbons, super critical carbon dioxide. and the like.

When polymers with glass transition temperatures greater than room temperature are formed, film forming agents or plasticizers of various types may be incorporated into the formulations. Such plasticizers may be (1) of a nonreactive nature. illustrative of which are the various esters, ketones, hydroxyethers, and the like which may be fugitive in nature when they have low molecular weight and are lost via evaporation or may be retained by the dry film when they have relatively high molecular weight; (2) of a reactive nature and contain ethylenic unsaturation which reacts with the unsaturation in the polymers of the invention and thus become incorporated into the final film, illustrative of which are diethylene glycol diacrylate, ethylene glycol diacrylate, divinyl adipate, disiopropenyl adipate, divinyl succinate, vinyl crotonate, diallyl phthalate, urethane acrylates, acrylated epoxides, timethylol propane triacrylate, pentaerythritol triacrylate and tetraacrylate, and the like; or (3) a mixture of nonreactive and reactive plasticizers.

Optional heavy metal driers that may be incorporated into the coatings to promote curing. These driers are metal salts of organic acids illustrative of which acids are tall oil fatty acids, ethylhexanoic acid, neodecanoic acids, naphthenic acids, and the like. Illustrative of typical metals used for air- or ambient-dry systems are cobalt, zirconium, and manganese, and the like, and for heat-cure coatings are iron, manganese, cobalt, cerium, and the like. Auxiliary driers include lead, barium, calcium, zirconyl (ZrO—), zinc, and the like. If desired, mixtures of the various driers can be used.

Illustrative of the peroxides or compounds that will generate oxygen when heated that can be used in the thermally curable coating compositions of this invention are benzoyl peroxide, t-butyl peroxybenzoate, diisopropyl peroxide, and the like. These compounds are used in an amount of about 0.05% to about 5%, preferably from about 0.1% to about 2.5%. It is known to those skilled in the art of these compounds that the cure temperature and decomposition temperature of any chosen compound must be properly considered when they are used.

Illustrative of the homolytic fragmentation-type photoinitiators used in the photocurable coating compositions are 2,2-diethoxyacetophenone, 2,2-dimethoxy-2-phenylacetopheneone, 1-hydroxycyclohexylphenyl ketone, acetophenone, and the like. Illustrative of the hydrogen abstraction-type photoinitiators are benzophenone, benzophenone derivatives, 2-chlorothioxanthone, isopropylthioxanthone, fluorenone, benzil, 9,10-anthraquinone, camphor quinones, 1,3,5-triacetylbenzene, 3-ketocoumarines, acridone, bis-(4,4'-dimethylamino)benzophenone, and the like. Illustrative of the synergists useful in combination with the hydrogen abstraction-type photoinitiators are amine, amides, urethanes or ureas with a hydrogen-bearing carbon atom in the alpha position to the nitrogen group among which one can mention dimethylethanol amine, triethyl amine; primary, secondary, and tertiary amine-terminated poly(propylene oxide) polyols as well urea and urethane derivatives of such polyols, and the like.

Although many of the reactive polymers of this invention can be cured alone with or without added photoinitiator when exposed to ultraviolet light, they may be combined with one or more other radiation-polymerizable ethylenically unsaturated compounds such as substituted or unsubstituted (meth)acrylates. Illustrative of the (meth)acrylates suitable for use in the radiation curable compositions of the invention are the esters of (meth)acrylic acid with monohydric and polyhydric compounds among which one can mention ethyl, butyl, hexyl, octyl, decyl, and the like (meth)acrylates; neopentyl (meth)acrylate, trimethylolpropane tri(meth)acrylate, pentaerythritol tri(meth)acrylate and tetra(meth)acrylate, caprolactone (meth)acrylates which are adducts of 1 to 10 moles of epsilon-caprolactone and a hydroxylalkyl (meth)acrylate, alkoxylated (meth)acrylates, glycerol (meth)acrylates, 1,4-butanediol di(meth)acrylate, 1,6-hexanediol di(meth)acrylate, 2,2-dimethyl-3-hydroxypropyl-2,2-dimethyl-3-hydroxypropionate di(meth)acrylate, isobornyl (meth)acrylate, tripropylene glycol di(meth)acrylate, unsaturated polyesters, 2,2-dimethyl-3-hydroxypropyl-2,2-dimethyl-3-hydroxypropionate di(meth)acrylates as well as alkoxylated versions of such di(meth)acrylates, urethane (meth)acrylates, (meth)acrylated epoxides, (meth)acrylated linseed oil, (meth)acrylated soybean oil, (meth)acrylated polybutadiene, and the like. In addition, the formulations may contain N-vinyl pyrrolidone, divinylbenzene, and the like.

The reactive polymers, e.g., aqueous emulsions, of this invention can be formulated with a variety of vinyl esters alone or in combination with other radiation-polymerizable ethylenically-unsaturated compounds in the photocurable compositions of this invention. Illustrative of the vinyl esters are vinyl 2-ethylhexanoate, vinyl benzoate, vinyl isovalerate, vinyl nonylates, vinyl neononanoate, vinyl neodecanoate, vinyl myristate, vinyl oleate, vinyl linoleate, vinyl abietate, divinyl adipate, divinyl oxalate. divinyl succinate, divinyl fumarate, divinyl maleate, diisopropenyl adipate, trivinyl mellitate, trivinyl citrate, 1,2,4-trivinyl benzenetricarboxylate, tetravinyl mellophanate, 3,3',4,4'-tetravinyl benzophenonetetracarboxylate, and the like. Such vinyl ester can also be used as reactive flexibizers/plasticizers in other non-photocurable coating compositions of the invention.

The photopolymerization is carried out by exposing the uncured film or coating to light radiation which is rich in short wave radiation. Particularly useful is radiation of about 200 to 450 nanometers in wavelength. Illustrative of appropriate light sources are low-pressure, medium pressure, and high-pressure mercury vapor lamps as well as lamps of this type that have been doped to exclude selected wavelengths; xenon and other flash-type lamps; lasers operating in the above listed wavelength range; sunlight, and the like. Other sources of radiant energy such as electron beams, gamma radiation, X-rays, and so on can also be used.

Any permissible conventional additives, processing aids, etc. may be employed in conventional amounts in the compositions and processes of this invention. This invention is not intended to be limited in any manner by any permissible additives, processing aids, and the like.

The coating compositions of the invention are applied to appropriate substrates as thin films by a variety of processes illustrative of which are roll coating, dip coating, spray coating, brushing, flexographic, lithographic, and offset-web printing processes, and the like.

As used herein, the term "substituted" is contemplated to include all permissible substituents of organic compounds unless otherwise indicated. In a broad aspect, the permissible substituents include acyclic and cyclic, branched and unbranched, carbocyclic and heterocyclic, aromatic and nonaromatic substituents of organic compounds. Illustrative substituents include, for example, alkyl, alkyloxy, aryl, aryloxy, hydroxy, hydroxyalkyl, amino, aminoalkyl, halogen and the like in which the number of carbons can range from 1 to about 20 or more, preferably from 1 to about 12. The permissible substituents can be one or more and the same or different for appropriate organic compounds. This invention is not intended to be limited in any manner by the permissible substituents of organic compounds.

The invention is illustrated by certain of the following examples.

Glossary of Terms and Compound

Gel Fraction—The gel fraction or gel content is the amount of material that is insoluble when a given mass of the cured coating is extracted with tetrahydrofuran (THF) for 18 hours at room temperature. The extracted film is removed from the THF, rinsed with fresh THF, and dried at 110° C. for one hour. The gel fraction, expressed as a percentage, is calculated with the following expression.

Gel Fraction=(1−((Weight of original film−Weight extracted film)/(Weight of original film))×(100%)

Gloss, 60° —ASTM D 523
Yellowness Index—ASTM D 1925
Pencil Scratch Hardness—ASTM D 3363
Crosshatch Adhesion—ASTM D 3359

Acetone Double Rubs are a measure of the resistance of the cured film to attack by acetone in which test a film coating surface was rubbed with an acetone-soaked cloth back and forth with hand pressure. A rub back and forth over the film coating surface with the acetone soaked cloth, which is usually a nonwoven type cloth material, was designated as one "double acetone rub,." The number of double rubs given as a value is the number of double rubs after which the film is noticeably affected by the action.

Water Spot Test—ASTM D-2247

Alkyd 1—A water reducible, styrenated alkyd resin commercially available from Cargill.

Photoinitiator I—A free-radical generating photoinitiator commercially available from Ciba-Geigy Corporation as Irgacure®b 651.

Surfactant 1—A sodium dioctyl sulfosuccinate anionic surfactant commercially available from American Cyanamid Company under the designation Aerosol® OT-75.

Surfactant 2—A 70% solution of nonyl phenol-based alkylene oxide nonionic surfactant in water commercially available from Union Carbide Chemicals and Plastics Company Inc. under the designation Tergitol® NP-40.

Surfactant 3—A nonyl phenol-based alkylene oxide nonionic surfactant commercially available from Union Carbide Chemicals and Plastics Company Inc. under the designation Tergitol® NP-15.

Surfactant 4—A sodium dodecyl benzyl sulfonate anionic surfactant commercially available from WITCO Corporation under the designation Witconate® (W1233H.

Surfactant 5—A fluorochemical surfactant commercially available from 3M Company under the designation FC-430.

EXAMPLES

Preparation A

Preparation of cyclohexyl carbodiimide ethyl methacrylate

Step 1. Preparation of a urea methacrylate solution. To a five-liter, three-neck, round bottom, glass reaction flask equipped with a mechanical stirrer, thermometer, and feed tank, 1,500 grams of methylene chloride solvent and 356.8 grams of isocyanato ethyl methacrylate reactant were added and cooled to 5° C. A mixture of 228.1 grams of cyclohexyl amine and 199 grams of methylene chloride were added to the feed tank over a two-hour period at such a rate that the temperature was maintained between 2° C. and 13° C. Agitation was supplied during the entire reaction period. When the cyclohexyl amine addition was complete, 0.05 grams of 2,6-di-tert-butyl-4-methylphenol stabilizer was added, and the agitated contents of the reactor were maintained at 14° C. for 16 hours. The resulting urea methacrylate solution was stored at room temperature for future use.

Step 2. Preparation of cyclohexyl carbodiimide ethyl methacrylate. Seven liters of methylene chloride were added to a 12-liter, jacketed glass reaction flask equipped with a mechanical stirrer, a nitrogen purge tube, thermometer, and feed tank. The methylene chloride was cooled to 6° C. and then 720.8 grams of triphenyl phosphine were added. A nitrogen sparge was begun and a mixture of 439.1 grams of bromine and 200 millileters of methylene chloride were fed to the reactor by means of the feed tank to form a solution of triphenyl phosphine dibromide in the reactor. Then a mixture of 562.2 grams of triethyl amine and 150 milliliters of methylene chloride were fed to the reactor by means of the feed tank. During the additions of reactants, the temperature was maintained below 15° C. Then, the stored urea methacrylate of Step 1 was placed in the feed tank and fed to the solution of triphenyl phosphine dibromide and triethyl amine over a 2.5 hour time period at a rate so as to keep the reaction temperature below 11° C. After addition of the Step 1 product was complete, the reaction mixture was stirred overnight at room temperature to complete the reaction to the cyclohexyl carbodiimide ethyl methacrylate.

The next morning, the reaction mixture was washed five time with 760 milliliters portions of water. The organic solution was then dried with 4A molecular sieves. The methylene chloride was then remove from the reaction mixture by means of a roto-evaporator. A total of 1,289 grams of crude, solvent-free reaction product was obtained. Cyclohexyl carbodiimide ethyl methacrylate was extracted from the crude reaction product by three successive additions of 800 milliliters aliquots of hexane. Hexane was removed from the crude carbodiimide methacrylate by means of a roto-evaporator. The yield of crude carbodiimide was 480 grams, which was purified by distillation in a Kontes' Falling Film Molecular Still. Yield of the 96of pure desired cyclohexyl carbodiimide ethyl methacrylate product with a molecular mass of 236 was 74% with purity determined by gas chromatography, infrared analysis of the —N═C═N—band at 2120 cm-1 as well as other characteristic bands from both infrared and NMR analysis. The product had a density of 1.020 grams/milliliters (25° C.) and a refractive index of 1.4911 (24.8° C.) and was stored for future use.

Preparations B,C and D

Preparation of various carbodiimide ethyl methacrylates.

The carbodiimide methacrylates described in Table 1 were prepared in the same manner as described for Preparation A except that the indicated amine was substituted for the cyclohexyl amine used in Step 1 of Preparation A.

TABLE 1

| Preparation | Amine Used | Product Formed | Purity | Density (25° C.) | Refractive Index (24.8° C.) |
|---|---|---|---|---|---|
| B | t-butyl | t-butyl carbodiimide ethyl methacrylate | 100 | 0.964 | 1.4619 |
| C | i-propyl | i-propyl carbodiimide ethyl methacrylate | 99.3 | 0.982 | 1.4685 |
| D | analine | phenyl carbodiimide ethyl methacrylate | 96.4 | 1.0893 | 1.5501 |

Preparation E

Preparation of a carbodiimide dimethacrylate

Step 1. Preparation of a urea methacrylate solution. To a 500 milliliter, three-neck, round bottom, glass reaction flask equipped with a mechanical stirrer, thermometer, condenser, and a nitrogen purge, 120 grams of methyl Propasol ® acetate, 40.45 grams of 2-hydroxyethyl methacrylate, and 2.0 grams of 2,3-di-tert-butyl-4-methylphenol were added. The stirred solution cooled to 0° C., and 69.07 grams of isophorone diisocyanate were added. Stirring was continued for the remainder of the reaction period. This mixture was heated to 90° C. and held at temperature for three hours at which time an addition 12.13 grams of 2-hydroxyethyl methacrylate were added. Heating was continued at 90° C. for 2.3 hours. Then, the reaction temperature was increased to 145° C. and 30 grams of a 10% solution of 3-methyl-1-phenyl-2-phospholene-1-oxide in xylenes were added. The reaction temperature was maintained at 145° C. for eight hours after which time the carbodiimide methacrylate was covered in the same manner as described in Preparation A. Infrared and NMR analysis indicated the final product was a mixture that contained 32.9% of a carbodiimide dimethacrylate (molecular mass 660.4), 17.2% of a dicarbodiimide dimethacrylate (molecular mass 838.6), 42.5% of a dimethacrylate (molecular mass 482.3), and 4.1% of a 352.2 molecular mass compound. Molecular masses and weight percentages were determined by mass spectroscopy and gel permeation chromatography using polystyrene standards.

Preparation F

Preparation of aqueous emulsion polymer

A monomer solution mixture composed of the compounds in Table 2 was prepared.

TABLE 2

| Monomer | Grams Used | Wt. % of Mixture |
|---|---|---|
| Methyl methacrylate | 450.0 | 44.2 |
| Styrene | 200.0 | 19.7 |
| n-Butyl methacrylate | 250.0 | 24.6 |
| Methacrylic acid | 100.0 | 9.8 |
| Mercaptoacetic acid | 17.2 | 1.7 |

A glass resin kettle equipped for temperature control and agitation was charged with 1,100.0 grams of deionized water, 0.34 gram of Surfactant 1, 1.30 grams of Surfactant 2, and 50 grams of the monomer solution. A nitrogen purge was started in the reaction mixture, and the contents of the resin kettle were increased to 85° C. at which point an initiator mixture consisting of 5.6 grams of ammonium persulfate dissolved in 147 grams of deionized water were added to the kettle and the temperature was set and maintained at 80° C. The remainder of the monomer solution was then fed to the reactor over a period of 225 minutes. Five minutes after the monomer feed was started, an initiator feed composed of 4.2 grams of ammonium persulfate dissolved in 107.8 grams of deionized water was started and fed to the reactor over a time period of 240 minutes. Fifteen minutes after the initiator feed was completed, a post initiator solution composed of 0.3 grams of ammonium persulfate and 0.3 grams of sodium metabisulfite dissolved in 49.4 grams of water was added over a time period of 30 minutes. After the final addition of reaction material, the aqueous emulsion of polymer was kept at the 80° C. reaction temperature for an additional 30 minutes. Analysis indicated that the emulsion had a pH of 2.25, a Brookfield viscosity of 7.1 centipose (LVT #1 at 60 rpm). There was a 96.1% conversion of monomer, polymer or solids content was 40.66%, and the polymer had a Mn of 10,800 and a Mw of 26,800 grams/mole.

EXAMPLE 1

Modification of Preparation F aqueous emulsion

Step 1. An emulsion of the Preparation A cyclohexyl carbodiimide ethyl methacrylate was prepared by first adding 0.28 grams of ammonium hydroxide to 28.8 grams of deionized water in a glass container and then adding 17.2 grams of Preparation A methacrylate and 0.288 grams of Surfactant 2 to the mixture. The mixture of compounds was agitated to effect emulsification.

Step 2. To a three-necked, round-bottomed glass reaction flask equipped with a condenser, mechanical stirrer, and thermometer 150 grams of Preparation F aqueous emulsion were added. While stirring the emulsion, 1.5 grams of Surfactant 2 were added and the pH of the emulsion was adjusted to 8.5 with a 14% aqueous solution of ammonium hydroxide. After 40 minutes, the pH was redetermined and found to be unchanged at 8.5. Then, the Step 1 emulsion was added and the mixture was stirred for 30 minutes. The temperature was increased to 80° C. and held at this temperature for 22 hours. Gas chromatography confirmed the reaction of carbodiimide groups and carboxyl groups had reached completion. The aqueous emulsion polymer had a final pH of 6.1. An additional 1.5 grams of Surfactant 1 and 0.38 grams of Foamaster ® (Henkel) were added to the final emulsion before storage for future use for characterization.

Twenty grams of the reactive polymer of Example 1 were air dried (indicating no gel fraction), dissolved in tetrahydrofuran, and then precipitated in water. The resultant polymer with pendant unsaturation provided by the free acrylate groups was filtered and then vacuum dried at 60° C. overnight. Titration for free carboxylic add moieties on the polymer indicated that 95% of these groups had been consumed as a result of modification with the carbodiimide of Preparation A. NMR analysis of the dried polymer indicated that it contained 95% of the theoretical amount of ethylenic unsaturation that should exist in the form of methacrylate groups.

EXAMPLES 2-7 AND CONTROLS I-VI

Evaluation of aqueous emulsion polymers

To 6.31 gram portions of the Example 1 aqueous emulsion polymer product, 5 parts of t-butyl peroxybenzoate were added per 100 parts of the product. To these mixtures, the reactive filming aid in the amount indicated in Table 3 was added. The ingredients were stirred for 30 minutes or more and then oven cured in aluminum dishes at the indicated temperatures for 30 minutes. After the samples cooled to room temperature, 50 milligram samples of each were removed from the pans and gel fraction was determined as a percentage and is given in Table 3.

TABLE 3

| Example | Filming Aid | Amount phr* | Percent Gel Fraction Temperature | | | |
|---|---|---|---|---|---|---|
| | | | 120° C. | 130° C. | 140° C. | 160° C. |
| 2 | None | — | 48.37 | 69.61 | 78.04 | 85.91 |
| 3 | 1,1,1-Trimethyol propane triacrylate | 3.0 | 57.87 | 74.64 | 79.34 | 85.45 |
| 4 | 1,1,1-Trimethyol propane triacrylate | 7.0 | 45.90 | 72.59 | 80.67 | 87.28 |
| 5 | Diethylene glycol dimethacrylate | 7.0 | 50.98 | 69.17 | 78.93 | 85.56 |
| 6 | Pentaerythritol triacrylate | 7.0 | 38.15 | 66.91 | 79.31 | 87.36 |
| 7 | Pentaerythritol tetraacrylate | 7.0 | 39.20 | 63.16 | 76.74 | 88.30 |

*phr = parts per hundred parts, i.e., parts of filming aid per 100 parts of mixture.

The moderate to high gel content for all samples, including those without reactive plasticizer, indicates that when the emulsion polymers are heated alone or with acrylates that contain ethylenic unsaturation in combination with oxygen-producing compounds, they undergo significant insolublization. To demonstrate the difference modification of the aqueous emulsion product makes on cure properties, the original Preparation F aqueous emulsion used to make Example 1 product was formulated and cured in the same way as described above. The gel fraction, expressed as a percentage, results given in Table 4, show that the aqueous emulsion polymer products of this invention (Table 3 results) undergo greater insolublization than the unmodified aqueous emulsion polymer products. Insignificant insolubilization took place when the Preparation F product was heated without added acrylate.

TABLE 4

| Controls | Filming Aid | Amount phr* | Percent Gel Fraction Temperature | | | |
|---|---|---|---|---|---|---|
| | | | 120° C. | 130° C. | 140° C. | 160° C. |
| I | None | — | 0.76 | 0.39 | 0.57 | 0.75 |
| II | 1,1,1-Trimethyol propane triacrylate | 3.0 | 1.96 | 1.38 | 0.990 | 0.36 |
| III | 1,1,1-Trimethyol propane triacrylate | 7.0 | 5.14 | 6.60 | 7.39 | 9.62 |
| IV | Diethylene glycol dimethacrylate | 7.0 | 5.76 | 5.92 | 6.08 | 7.27 |
| V | Pentaerythritol triacrylate | 7.0 | 4.90 | 8.37 | 11.43 | 10.48 |
| VI | Pentaerythritol teraacrylate | 7.0 | 5.09 | 5.26 | 5.19 | 7.28 |

*phr = parts per hundred parts, i.e., parts of filming aid per 100 parts of mixture.

EXAMPLE 8-11

Evaluation of aqueous emulsion polymers

To 12.0 gram portions of the Example 1 emulsion product, the ingredients given in Table 5 were added and the mixtures were stirred for 30 minutes. The formulations were coated onto Bonderite cold-rolled steel panels with a draw-down rod to yield 10-mil wet coatings which were thermally cured in a forced-air oven at 160° C. Properties of the cured coatings are given in Table 5.

TABLE 5

| Ingredients, grams | Examples | | | |
|---|---|---|---|---|
| | 8 | 9 | 10 | 11 |

TABLE 5-continued

| | Examples | | | |
|---|---|---|---|---|
| | 8 | 9 | 10 | 11 |
| Example 1 emulsion product | 12.0 | 12.0 | 12.0 | 12.0 |
| t-Butyl peroxybenzoate | — | 0.23 | 0.23 | 0.23 |
| Trimethylol propane triacrylate | — | — | 0.32 | — |
| Pentaerythritol triacrylate | — | — | — | 0.32 |
| Cured Film Properties | | | | |
| Thickness, mils | 1.2 | 1.3 | 1.4 | 1.9 |
| Gloss, 60° | 29 | 97 | 91 | 89 |
| Yellowness Index | 26.5 | 23.7 | 30 | 23.1 |
| Pencil Scratch Hardness | 4H | 2H | 2H | 4H |
| Crosshatch Adhesion | 1B | — | 2B | 2B |
| Acetone Double Rubs | 100 | 100+ | 100+ | 100+ |
| Water Spot Test | Passed | Passed | Passed | Passed |

The properties obtained with the emulsion polymers when heated alone or with acrylates that contain ethylenic unsaturation in combination with or without oxygen-producing compounds, indicate that a variety of useful coating properties result.

EXAMPLES 12-14

Evaluation of Aqueous emulsion polymers

The formulations indicated in Table 6 were stirred for 30 minutes and then coated by the draw-down technique onto cold-rolled steel panels to form a 10 mil wet coating. The coatings were exposed to the ultraviolet light from a 300 watt-per-inch, medium-pressure mercury vapor lamp for 14 seconds. After ultraviolet light exposure the gel fraction content was determined and is reported as a percentage in Table 6. The results indicate that insolubilization took place under the conditions of ultraviolet light exposure.

TABLE 6

| Ingredients, grams | Examples | | |
|---|---|---|---|
| | 12 | 13 | 14 |
| Example 1 emulsion product | 5.0 | 10.0 | 10.0 |
| Photoinitiator I | 0.08 | 0.16 | 0.16 |
| Trimethylol propane triacrylate | — | 0.27 | — |
| Pentaerythritol triacrylate | — | — | 0.27 |
| Surfactant 5 | 1 Drop | 1 Drop | 1 Drop |
| Gel Fraction, % | 41.0 | 36.5 | 26.6 |

PREPARATION G

Preparation Of aqueous emulsion polymer

A monomer solution mixture composed of the compounds in Table 7 was prepared.

TABLE 7

| Monomer | Grams Used | Wt. % of Mixture |
|---|---|---|
| Vinyl acetate | 750.0 | 74.56 |
| Vinyl 2-ethyl hexanoate | 189.57 | 18.82 |
| Methyl methacrylate | 7.20 | 0.71 |
| Monovinyl adipate | 60.43 | 6.00 |

A glass resin kettle equipped for temperature control, a means of introducing reactants, and agitation was charged with 765.56 grams of deionized water, 1.22 grams of aqueous, 0.02% ferric chloride solution, 25.8 grams of Surfactant 2, 6.00 grams of Surfactant 3, 13.00 grams of Surfactant 4, 4.0 grams of hydroxyethyl cellulose (WP-300, Union Carbide Chemical and Plastics Company Inc.), 4.00 grams sodium vinyl sulfonate, and 2.00 grams sodium acetate. A nitrogen purge was started in the reaction mixture, and the contents of the resin kettle were increased to 65° C. at which point two catalyst feeds were started. One feed consisted of 0.64 gram of sodium vinyl sulfonate dissolved in 60.0 grams of water and the other feed was composed of 0.64 gram of t-butyl hydroperoxide dissolved in 60.0 grams of water. These were fed to the reactor over a 250-minute time period. Ten minutes after the two catalyst feeds were started, the monomer solution was fed to the reactor over a period of 180 minutes. After completion of the monomer feed, the temperature was increased to 75° C. and the reactants were kept at this temperature for 1 hour. Analysis indicated that conversion was 99% and the solids content of the aqueous emulsion was 52.95%.

EXAMPLE 1

Modification of Preparation G aqueous emulsion

Step 1. An emulsion of the Preparation A cyclohexyl carbodiimide ethyl methacrylate was prepared by first adding 0.2 grams of ammonium hydroxide to 80 grams of deionized water in a glass container and then adding 13.1 grams of Preparation A methacrylate and 0.5 gram of Surfactant 2 to the mixture. The mixture of compounds was agitated to effect emulsification.

Step 2. To a three-necked, round-bottomed glass reaction flask equipped with a condenser, mechanical stirrer, and thermometer 300 grams of Preparation G aqueous emulsion were added. While stirring the emulsion, 3.0 grams Surfactant 2 were added, and the pH of the emulsion was adjusted to 7.8 with a 14% aqueous solution of ammonium hydroxide. After 1 hour, the pH was readjusted to 7.8. Then, the Step 1 emulsion was added and the mixture of aqueous emulsions was stirred for 30 minutes. The temperature was increased to 80° C. and held at this temperature for 3 hours. Then 0.68 gram of Foamaster® VF (Henkel) was added the stirring was continued for 30 minutes. The final aqueous emulsion of ethylenically unsaturated, nitrogen-containing polymer had a pH of 7.7 and a solids content of 41.8%. When one gram of the emulsion was added to 20 milliliters of tetrahydrofuran, a clear solution resulted.

EXAMPLES 16-18

Evaluation of aqueuous emulusion polymers

Samples of the Example 15 aqueous emulsion were formulated and cured as in the same manner described for Examples 2-7. After the samples cooled to room temperature, 50 milligram samples of each were removed from the pans and gel fraction was determined as a percentage and is given in Table 8.

TABLE 8

| Examples | Filming Aid | Amount phr* | Percent Gel Fraction Temperature | | | |
|---|---|---|---|---|---|---|
| | | | 120° C. | 130° C. | 140° C. | 160° C. |
| 16 | None | — | 79.68 | 83.04 | 88.06 | 88.03 |
| 17 | 1,1,1-Trimethyol propane triacrylate | 3.0 | 77.20 | 90.14 | 92.84 | 91.85 |
| 18 | 1,1,1-Trimethyol propane triacrylate | 7.0 | 85.26 | 91.16 | 92.41 | 95.26 |

*phr = parts per hundred parts, i.e., parts of filming aid per 100 parts of mixture.

The results indicate that a high degree of insolubilization was obtained for all samples.

EXAMPLES 19-23

Evaluation of aqueous emulsion polymers

Samples of the Example 15 aqueous emulsion were formulated in the manner described in Examples 2-7 except that diallyl phthalate was used as the reactive filming aid. Before stirring, drier salts were added to some of the examples as indicated in Table 9. The films were allowed to air cure under ambient conditions for 12 days after which gel content was determined. Gel fraction was determined as a percentage and is given in Table 9. The results indicate that significant gel contents are obtained with and without added drier salts.

TABLE 9

| Ingredients, parts by weight | Examples | | | | |
|---|---|---|---|---|---|
| | 19 | 20 | 21 | 22 | 23 |
| Example 15 emulsion product | 100 | 100 | 100 | 100 | 100 |
| Diallyl phthalate | — | 5 | — | 5 | 5 |
| Cobalt 2-ethyl-hexanoate | — | — | 1 | 1 | 0.6 |
| Zirconium octoate | — | — | — | — | 0.6 |
| Gel Fraction, % | 57.8 | 54.3 | 40.2 | 57.5 | 49.4 |

The film prepared in Example 19 had a thickness of 1.4 mil, a 60° gloss of 76, a crosshatch adhesive value of 5B, a pencil hardness of HB, and 40 acetone double rubs cut through the film.

EXAMPLES 24-31

Modification of aqueous emulsion polymer

A water dispersed master batch, designated as Batch 1 Alkyd (containing Alkyd 1) was prepared by adding 12 grams of ammonium hydroxide to 52 grams of deionized water and then dispersing 292 grams of Alkyd 1 in the solution by stirring. To 20 grams of Example 15 aqueous emulsion, the drier salts and Batch 1 Alkyd in the amounts indicated in Table 10 were added and the ingredients were stirred for 30 minutes to form water dispersed alkyd. The coatings were applied to Bonderite cold rolled steel panels with the draw down technique to form 10-mil wet films. The films were allowed to cure for 2 days under ambient conditions except for Example 24 which was cured 12 days.

of Preparation B. NMR analysis of the dried polymer indicated that it contained 76% of the theoretical

TABLE 10

| Added Ingredients, grams | Examples | | | | | | | |
|---|---|---|---|---|---|---|---|---|
| | 24 | 25 | 26 | 27 | 28 | 29 | 30 | 31 |
| Drier salts | | | | | | | | |
| Cobalt octoate | — | — | 0.042 | 0.084 | — | 0.42 | 0.084 | 0.042 |
| Zirconium octoate | — | — | 0.042 | 0.084 | — | 0.42 | 0.084 | 0.042 |
| Batch 1 alkyd | — | 2.5 | 0.6 | 0.6 | 2.5 | 0.6 | 0.6 | 2.5 |
| Cured Film Properties | | | | | | | | |
| Gel Fraction, % | 57.8 | 50.6 | 64.0 | 54.8 | 30.3 | 70.7 | 56.2 | 73.3 |
| Film Thickness | 1.4 | 1.5 | 1.3 | — | 2.2 | 2.5 | 2.4 | 1.9 |
| Gloss, 60° | 76 | 53 | 44 | — | 40 | 20 | 16 | 34 |
| Acetone Double Rubs | 40 | 42 | 30 | — | 50 | 70 | 90 | 100+ |
| Crosshatch Adhesion | 5B | 1B | 4B | — | 4B | 4B | 5B | 5B |
| Pencil Hardness | HB | HB | B | — | 3B | 3B | 3B | 3B |

The results indicate that alkyds can be used to modify the aqueous emulsion polymers of the invention. Significant gel contents as well as good coating properties are obtained with or without the use of drier salts.

EXAMPLE 32

Modification of Preparation F aqueous emulsion

Step 1. An emulsion of the Preparation B t-butyl carbodiimide ethyl methacrylate was prepared by first adding 0.56 gram of ammonium hydroxide to 60 grams of deionized water in a glass container and then adding 30.6 grams of Preparation B methacrylate and 0.600 gram of Surfactant 2 to the mixture. The mixture of compounds was agitated to effect emulsification.

Step 2. To a three-neck, round-bottom, glass reaction flask equipped with a condenser, mechanical stirrer, and thermometer 300 grams of Preparation F aqueous emulsion were added. While stirring the emulsion, 3.0 grams of Surfactant 2 were added and the pH of the emulsion was adjusted to 8.5 with a 14% aqueous solution of ammonium hydroxide. After 40 minutes, the pH was redetermined and found to be unchanged at 8.5. Then, the Step 1 emulsion was added and the mixture was stirred for 30 minutes after which time the temperature was increased to 80° C. and the reaction mass was held at this temperature for 22 hours. Gas chromatography and infrared analyses confirmed the reaction of carbodiimide groups and carboxyl groups had reached completion after this time. Then, 0.68 grams of Foamaster ® VF (Henkel) were added and stirring was continued for 30 minutes. Final emulsion pH was 7.0 and solids content was 35.7%. The emulsion was stored for future use. Twenty grams of the above aqueous emulsion polymer were air dried, dissolved in tetrahydrofuran, and then precipitated in water. The resultant polymer with pendant unsaturation provided by the free acrylate groups was filtered and then vacuum dried at 60° C. overnight. Titration for free carboxylic acid moieties on the polymer indicated that 66% of these groups had been consumed as a result of modification with the carbodiimide amount of ethylenic unsaturation that should exit in the form of methacrylate groups.

EXAMPLES 33–38

Evaluation of aqueous emulsion polymers

To 6.31 grams portions of the Example 32 emulsion product, 5 parts of t-butyl peroxybenzoate were added per 100 parts of the Example 32 product. To these mixtures, the reactive filming aid in the amount indicated in Table 11 was added. The ingredients were stirred for 30 minutes or more and then oven cured in aluminum dishes at the indicated temperatures for 30 minutes. After the samples cooled to room temperature, 50 milligram samples of each were removed from the pans and gel fraction was determined as a percentage and is given in Table 11.

TABLE 11

| Examples | Filming Aid | Amount phr* | Percent Gel Fraction Temperature | | | |
|---|---|---|---|---|---|---|
| | | | 120° C. | 130° C. | 140° C. | 160° C. |
| 33 | None | — | 55.51 | 58.14 | 60.89 | 84.79 |
| 34 | 1,1,1-Trimethyol propane triacrylate | 3.0 | 53.17 | 65.77 | 74.32 | 85.55 |
| 35 | 1,1,1-Trimethyol propane triacrylate | 7.0 | 57.84 | 60.53 | 72.49 | 88.18 |
| 36 | Diethylene glycol dimethacrylate | 7.0 | 63.61 | 69.33 | 76.03 | 84.75 |
| 37 | Pentaerythritol triacrylate | 7.0 | 62.43 | 66.14 | 71.18 | 87.41 |
| 38 | Pentaerythritol tetraacrylate | 7.0 | 53.66 | 61.30 | 72.34 | 86.65 |

*phr = parts per hundred parts, i.e., parts of filming aid per 100 parts of mixture.

The high gel fractions for all samples, including those without reactive plasticizer, indicates that when the emulsion polymers are heated alone or with filming aids that contain ethylenic unsaturation in combination with oxygen-producing compounds, they undergo significant insolublization.

EXAMPLES 39–42

Evaluation of aqueous polymer emulsions

To 15.0 gram portions of the Example 32 emulsion product, the ingredients given in Table 12 were added and the mixtures were stirred for 30 minutes. The formulations were coated onto Bonderite cold-rolled steel panels with a draw-down rod to yield 10-rail wet coatings which were thermally cured in a forced-air oven at 160° C. Properties of the cured coatings are given in Table 12.

TABLE 12

| | Examples | | | |
|---|---|---|---|---|
| | 39 | 40 | 41 | 42 |
| Ingredients, grams | | | | |
| Example 32 product | 15.0 | 15.0 | 15.0 | 15.0 |

TABLE 12-continued

| | Examples | | | |
|---|---|---|---|---|
| | 39 | 40 | 41 | 42 |
| t-Butyl peroxybenzoate | — | 0.27 | 0.27 | 0.27 |
| Trimethylol propane triacrylate | — | — | 0.38 | — |
| Pentraerythritol triacrylate | — | — | — | 0.38 |
| Cured Film Properties | | | | |
| Thickness, mils | 1.4 | 1.8 | 1.6 | 1.5 |
| Gloss, 60° | 52 | 96 | 98 | 86 |
| Yellowness Index | 9.9 | 4.5 | 2.9 | 12.5 |
| Pencil Scratch Hardness | 3H | 3H | 3H | H |
| Acetone Double Rubs | 35 | 70 | 80 | 50 |
| Water Spot Test | Failed | Passed | Failed | Passed |

The properties obtained with the emulsion polymers when heated alone or with multifunctional acrylates that contain ethylenic unsaturation in combination with or without oxygen-producing compounds, indicate that a variety of useful coating properties result.

EXAMPLES 43–46

Evaluation of aqueous emulsion polymers

The formulations indicated in Table 13 were stirred for 30 minutes and then coated by the draw-down technique onto Bonderite cold-rolled steel panels to form a 10-mil wet coating. The coatings were exposed to the ultraviolet light from a 300 watt-per-inch, medium-pressure mercury vapor lamp for 14 seconds. After ultraviolet light exposure the gel fraction content was determined and is reported as a percentage in Table 13. The gel fraction results indicate that insolublization took place under the conditions of ultraviolet light exposure and the coating-test properties indicate that a useful coating can be made from the compositions of this invention.

TABLE 13

| | Examples | | | |
|---|---|---|---|---|
| | 43 | 44 | 45 | 46 |
| Ingredients, grams | | | | |
| Example 31 product | 20.0 | 20.0 | 20.0 | 20.0 |
| Photoinitiator 1 | — | 0.21 | 0.21 | 0.21 |
| Trimethylol propane triacrylate | — | — | 0.50 | — |
| Pentaerythritol triacrylate | — | — | — | 0.50 |
| Surfactant 5 | 1 Drop | 1 Drop | 1 Drop | 1 Drop |
| Gel Fraction, % | 18 | 79 | 83 | 84 |
| Cured Film Properties | | | | |
| Thickness, mils | 1.8 | 3.2 | 1.6 | 0.4 |
| Gloss, 60° | 25 | 19 | 77 | 73 |
| Yellowness Index | 2.9 | 8.6 | 18.5 | 10.0 |
| Pencil Scratch Hardness | — | 2H | 2H | 3H |
| Acetone Double Rubs | 48 | 100+ | 100+ | 100+ |

EXAMPLE 47

Modification of Preparation F aqueous emulsion

Step 1. An emulsion of triethylamine was prepared by placing 28.8 grams of deionized water and 11.52 grams of triethyl amine in a glass container and then adding 0.288 gram of Surfactant 2 to the mixture. The blend of compounds was agitated to effect emulsification.

Step 2. An emulsion of the Preparation B t-butyl carbodiimide ethyl methacrylate was prepared by first placing 28.8 grams of deionized water, 0.288 gram of triethylamine, 0.288 gram of Surfactant 2, and 15.5 grams of Preparation B carbodiimide methacrylate in a glass container and agitating the compounds to effect emulsification.

Step 3. To a three-neck, round-bottom, glass reaction flask equipped with a condenser, mechanical stirrer, and thermometer 150 grams of Preparation F aqueous emulsion were added. While stirring the emulsion, 1.48 grams of Surfactant 2 were added and the pH of the emulsion was adjusted to 7.5 with the Step 1 triethylamine emulsion. After 18 hours, the pH was adjusted from 7.0 to 7.5 with the Step 1 emulsion. Then, the Step 2 emulsion was added and the mixture was stirred for 30 minutes after which time the temperature was increased to 80° C. and the reaction mass was held at this temperature for 22 hours. Previous gas chromatography and infrared analyses had confirmed that the reaction of carbodiimide groups and carboxyl groups had reached completion after this time. Final emulsion of the aqueous emulsion had a solids content of 38.4%. The emulsion, which was soluble in tetrahydrofuran, was stored for future use. Twenty grams of the above aqueous emulsion polymer were air dried, dissolved in tetrahydrofuran, and then precipitated in water. The resultant polymer with pendant unsaturation provided by the free acrylate groups was filtered and then vacuum dried at 60° C. overnight. NMR analysis of the dried polymer indicated that it contained 65% of the theoretical amount of ethylenic unsaturation that should exit in the form of methacrylate groups.

EXAMPLES 48–50

Evaluation of aqueous polymer emulsions

To 6.31 gram portions of the Example 47 emulsion product, 5 parts of t-butyl peroxybenzoate were added per 100 parts of the Example 47 product. To these mixtures, the reactive filming aid in the amount indicated in Table 14 was added. The ingredients were stirred for 30 minutes or more and then oven cured in aluminum dishes at the indicated temperatures for 30 minutes. After the samples cooled to room temperature, 50 milligram samples of each were removed from the pans and gel fraction was determined as a percentage and is given in Table 14. The results indicate that significant amounts of the copolymers are insolubilized.

TABLE 14

| | | Amount | Percent Gel Fraction Temperature | | | |
|---|---|---|---|---|---|---|
| Examples | Reactive Filming Aid | phr* | 120° C. | 130° C. | 140° C. | 160° C. |
| 48 | None | — | 33.95 | 49.27 | 54.96 | 62.48 |
| 49 | 1,1,1-Trimethylol propane triacrylate | 3.0 | 49.22 | 49.91 | 65.91 | 75.05 |
| 50 | 1,1,1-Trimethylol propane triacrylate | 7.0 | 40.82 | 48.95 | 59.88 | 72.72 |

*phr = parts per hundred parts, i.e., parts of filming aid per 100 parts of mixture.

EXAMPLE 51

Modification of Preparation F aqueous emulsion

In the same manner as described in Example 1, Preparation F was modified with a carbodiimide methacrylate except 14.66 grams of isopropyl carbodiimide ethyl methacrylate Preparation C were substituted for the cyclohexyl carbodiimide ethyl methacrylate. The final emulsion had a solids content of 40.3%. Twenty grams of the resulting emulsion polymer was dissolved in tetrahydrofuran, precipitated with water, filtered, and vacuum dried at 60° C. overnight. Nuclear magnetic resonance analysis of the dried polymer indicated the copolymer contained 55.8% of the theoretical amount.

EXAMPLES 52–54

Evaluation of aqueous polymer emulsions

Formulations were prepared in the same manner as described in Examples 48–50 using the reactive filming aid in the amount indicated in Table 15. The cured formulations were analyzed for gel fraction. The results indicated that the cured formulations contained large amounts of insoluble material indicating good solvent resistance properties.

TABLE 15

| Examples | Reactive Filming Aid | Amount phr* | Percent Gel Fraction Temperature | | | |
|---|---|---|---|---|---|---|
| | | | 120° C. | 130° C. | 140° C. | 160° C. |
| 52 | None | — | 60.48 | 68.50 | 77.49 | 83.79 |
| 53 | 1,1,1-Trimethyol propane triacrylate | 3.0 | 63.55 | 73.42 | 81.77 | 87.13 |
| 54 | 1,1,1-Trimethyol propane triacrylate | 7.0 | 60.63 | 74.66 | 77.55 | 92.52 |

*phr = parts per hundred parts, i.e., parts of filming aid per 100 parts of mixture.

EXAMPLE 55

Modification of Preparation F aqueous emulsion

In the same manner as described in Example 1, Preparation F was modified with a carbodiimide methacrylate except 17.2 grams of phenyl carbodiimide ethyl methacrylate Preparation D was substituted for the cyclohexyl carbodiimide ethyl methacrylate. The final emulsion had a solids content of 40.3%. Twenty grams of the resulting emulsion polymer was dissolved in tetrahydrofuran, precipitated with water, filtered, and vacuum dried at 60° C. overnight. Nuclear magnetic resonance analysis of the dried polymer indicated the copolymer contained 59% of the theoretical amount.

EXAMPLES 56–58

Evaluation of aqueous polymer emulsions

Formulations were prepared in the same manner as described in Examples 48–50 using the reactive filming aid in the amount indicated in Table 16. The cured formulations were analyzed for gel fraction. The results indicated that the cured formulations contained significant amounts of insoluble material suggesting that coatings prepared from them would have good solvent resistance properties.

TABLE 16

| Examples | Reactive Filming Aid | Amount phr* | Percent Gel Fraction Temperature | | | |
|---|---|---|---|---|---|---|
| | | | 120° C. | 130° C. | 140° C. | 160° C. |
| 56 | None | — | 12.09 | 19.63 | 26.82 | 29.31 |
| 57 | 1,1,1-Trimethyol propane triacrylate | 3.0 | 17.74 | 32.43 | 36.95 | 40.42 |
| 58 | 1,1,1-Trimethyol propane triacrylate | 7.0 | 28.31 | 43.67 | 43.57 | 49.27 |

*phr = parts per hundred parts, i.e., parts of filming aid per 100 parts of mixture.

EXAMPLE 59

Modification of Preparation F aqueous emulsion

To a three-necked, round-bottomed glass reaction flask equipped with a condenser, mechanical stirrer, and thermometer 150 grams of Preparation F aqueous emulsion were added. While stirring the emulsion, 1.5 grams of Surfactant 2 were added and the pH of the emulsion was adjusted to 8.5 with a 14% aqueous solution of ammonium hydroxide. At this point, 40 grams of deionized water were added. After 30 minutes, the pH was adjusted to 8.5 with the ammonium hydroxide solution. Then, the 39.9 grams of Preparation E carbodiimide dimethacrylate containing 1% Surfactant 1 and 2% Surfactant 2 were added. The emulsion was stirred for 18 hours at room temperature and then the temperature was increased to 80° C. and maintained at this temperature with stirring for 22 hours. The final emulsion had a pH of 6.8 and a solids content of 42.8%. Twenty grams of the emulsion was air dried, dissolved in tetrahydrofuran, precipitated in water, filtered, and vacuum dried at 60° C. overnight. Titration of the carboxylic acid groups on the polymer indicated that 87% of these groups had been reacted with Preparation E carbodiimide dimethacrylate.

EXAMPLE 60–62

Evaluation Of aqueous polymer emulsions

Formulations were prepared in the same manner as described in Examples 48–50 using the reactive filming aid in the amount indicated in Table 17. The cured formulations were analyzed for gel fraction. The results indicated that the cured formulations contained large amounts of insoluble material suggesting that coatings prepared from them would have good solvent resistance properties.

TABLE 17

| Examples | Reactive Filming Aid | Amount phr* | Percent Gel Fraction Temperature | | | |
|---|---|---|---|---|---|---|
| | | | 120° C. | 130° C. | 140° C. | 160° C. |
| 60 | None | — | 31.84 | 32.16 | 45.23 | 55.96 |
| 61 | 1,1,1-Trimethyol propane triacrylate | 3.0 | 28.20 | 32.76 | 51.09 | 59.62 |
| 62 | 1,1,1-Trimethyol propane triacrylate | 7.0 | 23.01 | 45.83 | 50.96 | 67.76 |

*phr = parts per hundred parts, i.e., parts of filming aid per 100 parts of mixture.

EXAMPLES 63–66

Evaluation of aqueous polymer emulsions

Thermal-cure evaluation of coatings prepared from the Example 59 emulsion product alone and in combination with acrylates. To 15.0 gram portions of the Example 59 product, the ingredients given in Table 18 were added and the mixtures were stirred for 30 minutes. The formulations were coated onto Bonderite cold-rolled steel panels with a draw-down rod to yield 10-mil wet coatings which were thermally cured in a forced-air oven at 160° C. Properties of the cured coatings are given in Table 18.

TABLE 18

| | Examples | | | |
|---|---|---|---|---|
| | 63 | 64 | 65 | 66 |
| Ingredients, grams | | | | |
| Example 59 emulsion product | 15.0 | 15.0 | 15.0 | 20.0 |
| t-Butyl peroxybenzoate | — | 0.32 | 0.32 | 0.43 |
| Trimethylol propane triacrylate | — | — | 0.44 | — |
| Pentraerythritol triacrylate | — | — | — | 0.60 |
| Cured Film Properties | | | | |
| Thickness, mils | 2.2 | 1.9 | 1.9 | 2.0 |
| Gloss, 60° | 89 | 94 | 92 | 78 |
| Yellowness Index | 4.8 | 5.9 | 6.6 | 17.9 |
| Pencil Scratch Hardness | HB | HB | F | F |
| Acetone Double Rubs | 40 | 30 | 50 | 70 |
| Water Spot Test | Passed | Passed | Passed | Passed |

The properties obtained with the emulsion polymers when heated alone or with multifunctional acrylates that contain ethylenic unsaturation in combination with or without oxygen-producing compounds, indicate that a variety of useful coating properties result.

EXAMPLES 67–70

Evaluation of aqueous polymer emulsions

The formulations indicated in Table 19 were stirred for 30 minutes and then coated by the draw-down technique onto Bonderite cold-rolled steel panels to form a 10-mil wet coating. The coatings were exposed to the ultraviolet light from a 300 watt-per-inch, medium-pressure mercury vapor lamp for 14 seconds. After ultraviolet light exposure the gel fraction content was determined and is reported as a percentage in Table 19. The gel fraction results indicate that insolublization took place under the conditions of ultraviolet light exposure and the coating-test properties indicate that a useful coating can be made from the compositions of this invention.

TABLE 19

| | Examples | | | |
|---|---|---|---|---|
| | 67 | 68 | 69 | 70 |
| Ingredients, grams | | | | |
| Example 59 emulsion product | 20.0 | 20.0 | 20.0 | 20.0 |
| Photoinitiator I | — | 0.26 | 0.26 | 0.26 |
| Trimethylol propane triacrylate | — | — | 0.60 | — |
| Pentaerythritol triacrylate | — | — | — | 0.60 |
| Surfactant 5 | 1 Drop | 1 Drop | 1 Drop | 1 Drop |
| Gel Fraction, % | 40.0 | 56.1 | 65.2 | 65.0 |
| Cured Film Properties | | | | |
| Thickness, mils | 2.0 | 1.8 | 1.8 | 1.9 |
| Gloss, 60° | 89 | 73 | 80 | 81 |
| Pencil Scratch Hardness | 3H | 4H | 3H | 4H |
| Acetone Double Rubs | 100 | 100+ | 100+ | 100+ |

PREPARATION H

Preparation of a copolymer with free carboxylic acid groups by solution polymerization The following ingredients were charged to a dried three-neck round-bottom reaction flask equipped with a stirrer, nitrogen purge, and condenser: 302.4 grams of acetonitrile, 6.854 grams of methyl trimethyl silyl dimethyl ketene acetal, and 1.63 milliliters of 0.1M tri(-dimethylamino)sulfur (trimethyl silyl) difluoride in acetonitrile (catalyst). A liquid monomer mixture composed of 174.38 grams of methyl methacrylate, 107.1 grams of 2-ethylhexyl methacrylate, and 48.26 grams of trimethyl silyl methacrylate was fed to the reactor over a 37-minute time period. Then an additional 0.7 milliliter of catalyst was added to the reactor. The temperature increased from 23° C. to 33° C. during this time period. After 17 hours, 44 grams of a 50% water-tetrahydrofuran solution was added to the polymer solution, and the mixture was heated for 2 hours at 60° C. The polymer was precipitated by slowly pouring into water, vacuum dried (2 mm Hg) overnight at 80° C. When the polymer is precipitated in water, the trimethyl silyl methacrylate is hydrolyzed and a carboxylic acid group is formed. The yield was 298.1 grams of polymer with a $Mn=9640$ and $Mw/Mn=1.08$. The acid number of the polymer was 61.6.

EXAMPLE 71

Solution preparation of a copolymer with pendant ethylenically unsaturated groups Forty-four grams of the Preparation H copolymer containing free carboxylic acid groups, 160 grams of tetrahydrofuran, and 4.4 grams of triethylamine were added to a three-neck, round-bottom reaction flask equipped with a stirrer, nitrogen purge, and condenser. The reaction mass was heated to 60° C. Then 9.3 grams of Preparation A cyclohexyl carbodiimide ethyl methacrylate dissolved in 10 grams of tetrahydrofuran were fed to the reactor over a 10-minute time period. The reaction temperature was increased to 80° C. and held at this temperature for 44.5 hours. The resulting polymer was then precipitated into water, air dried for 2 days, and vacuum dried at 60° C. for 1.5 hours. There was a yield of 49 grams of the desired product which infrared analysis indicated analysis confirmed as containing ethylenic unsaturation from free methacrylate double bonds.

EXAMPLES 72–74

Evaluation of solution copolymer

The ingredients listed in Table 20 were well mixed and 4-mil wet films were drawn down on Bonderite cold-rolled steel panels. The coated panels were cured for 30 minutes at the indicted temperature in a forced-air oven. After the films were cured, approximately 50 milligram samples of each were removed and extracted for 18 hours in a Soxhlet extractor using tetrahydrofuran as the extractant. The extracted films were dried at 110° C. for 1 hour and then gel fraction, as a percentage was determined. The results given in Table 20 indicate that the films had a high gel content.

TABLE 20

| | Examples | | |
|---|---|---|---|
| Ingredients, grams | 72 | 73 | 74 |
| Example 71 solution copolymer | 5.0 | 5.0 | 5.0 |
| t-Butyl peroxybenzoate | 0.25 | 0.25 | 0.25 |

TABLE 20-continued

| Ingredients, grams | Examples | | |
|---|---|---|---|
| | 72 | 73 | 74 |
| Methyl Propasol ® acetate | 4 | — | — |
| Divinyl adipate | — | 4.5 | 4.0 |
| Pentaerythritol tetracrylate | — | — | 3.0 |
| Cure Temperature | Gel Fraction, % | | |
| 120° C. | 58.6 | 95.7 | 95.4 |
| 140° C. | 69.1 | 96.3 | 97.8 |
| 160° C. | 78.6 | 97.4 | 99.7 |

EXAMPLE 75

An radiation curable formulation was prepared by dissolving 5 grams of Example 71 solution copolymer and 0.1 gram of Photoinitiator 1 in 4.5 grams of divinyl adipate. A 4-mil wet film was drawn down onto a Bonderite cold-rolled steel panel and exposed to a 300 watt-per-inch medium-pressure mercury vapor lamp for 56 seconds. After exposure a 50 milligram sample was removed and gel fraction was determined as in Examples 72–74 to be 54.2% indicating significant reaction took place.

EXAMPLE 76

In the same manner as described in Example 75 except that 1.0 gram of divinyl adipate and 5 grams of pentaerythritol tetracrylate were used as solvent, another ultraviolet light curable formulation was prepared and coated. Exposure was for 11 seconds under the same radiation source. The gel fraction was found to be 93.8% indicating a very high degree of reaction.

Although the invention has been illustrated by certain of the preceding examples, it is not to be construed as being limited thereby; but, rather, the invention encompasses the generic area as hereinbefore disclosed. Various modifications and embodiments can be made without departing from the spirit and scope thereof.

We claim:

1. A polymer having one or more pendant flexible side chains connected thereto, wherein said pendant flexible side chains contain ethylenic unsaturation and are connected to said polymer by an N-acyl urea linkage, said N-acyl urea linkage formed by the reaction of an ethylenically unsaturated carbodiimide with a carboxylic acid group on said polymer.

2. The polymer of claim 1 wherein the ethylenically unsaturated carbodiimide is one or more carbodiimide (meth)acrylates.

3. The polymer of claim 2 wherein the carbodiimide (meth)acrylate is cyclohexyl carbodiimide ethyl methacrylate, t-butyl carbodiimide ethyl methacrylate, i-propyl carbodiimide ethyl methacrylate, phenyl carbodiimide ethyl methacrylate, carbodiimide di(ethyl methacrylate) or mixtures thereof.

4. The polymer of claim 2 wherein the carbodiimide (meth)acrylate is a mixture of carbodiimide acrylates and carbodiimide diacrylates.

5. The polymer of claim 1 which is a reactive polymer.

6. Polymer particle in an aqueous environment having one or more pendant flexible side chains connected thereto, wherein the pendant flexible side chains contain ethylenic unsaturation and are connected to the surface of the polymer particle by an N-acyl urea linkage, said N-acyl urea linkage formed by the reaction in an aqueous environment of an ethylenically unsaturated carbodiimide with carboxylic acid group on the surface of the polymer particle.

7. The polymer particle of claim 6 wherein the polymer particle comprises copolymers having number-average molecular weights of from about 1000 to about 1,000,000.

* * * * *